June 7, 1955 B. H. TONGUE ET AL 2,710,314

WIDE-BAND AMPLIFYING SYSTEM

Filed June 8, 1950 4 Sheets-Sheet 1

Inventors
Ben Hapgood Tongue
Isaac S. Blonder
by Rines and Rines
Attorneys

WIDE-BAND AMPLIFYING SYSTEM

Filed June 8, 1950 4 Sheets-Sheet 2

Inventors
Ben Hapgood Tongue
Isaac S. Blonder
by Rines and Rines
Attorneys

WIDE-BAND AMPLIFYING SYSTEM

Filed June 8, 1950

4 Sheets-Sheet 3

Inventors
Ben Hapgood Tongue
Isaac S. Blonder
by Rines and Rines
Attorneys

Inventors
Ben Hapgood Tongue
Isaac S. Blonder
by Rines and Rines
Attorneys

United States Patent Office 2,710,314
Patented June 7, 1955

2,710,314

WIDE-BAND AMPLIFYING SYSTEM

Ben Hapgood Tongue and Isaac S. Blonder, Mount Vernon, N. Y.

Application June 8, 1950, Serial No. 166,862
11 Claims. (Cl. 179—171)

Figure 1:
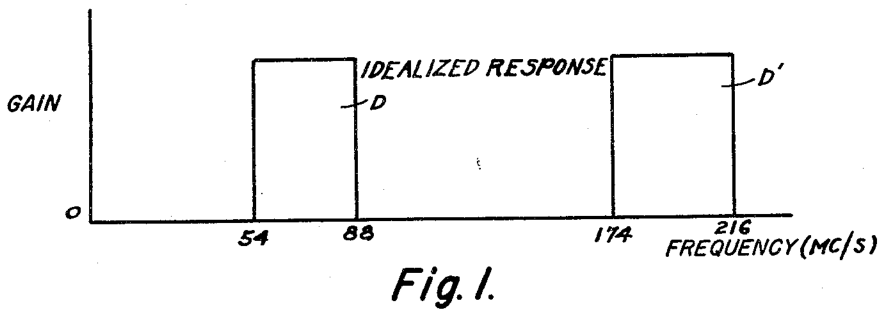

The present invention relates to broad- or wide-band amplifying systems and, more particularly, to radio-frequency amplifying systems for responding to a plurality of separated broad or wide radio-frequency bands.

An object of the present invention is to provide a new and improved system for amplifying a plurality of separated wide radio-frequency bands.

One of the important applications of the present invention is in the field of television. Various types of broad- or wide-band amplifiers, sometimes called pre-amplifiers or boosters, have been proposed for improving the performance of television receiver sets that must receive channel frequencies distributed over separated relatively wide radio-frequency bands. This improved performance is required particularly in the so-called "fringe areas," distant from or otherwise disadvantageously located with respect to the transmitting stations. These amplifying devices must amplify the television radio-frequency channel signals occurring in both the low-frequency television band, extending from about 54 megacycles to about 88 megacycles, and the high-frequency television band, widely separated from the low-frequency television band and extending from about 174 megacycles to about 216 megacycles. Since this amplification or signal boosting, moreover, is for the purpose of improving the response of the television or other receiving equipment, the device must be of relatively high quality. It is desired that the amplifier device improve the effective signal-to-noise ratio of the television receiving set, thereby to reduce, for example, the "snow" or flickering appearing upon the television receiver screen. Another object of the amplifier device is to increase the signal strength of all of the channels. Still a further advantage to be obtained through the use of a booster or amplifier device is the reduction in interference from signals other than television channel signals that are often picked up by the television receiver set, such as those emanating from high-frequency communication channels, diathermy machines and the like. Still a further desired result is to provide a good impedance match between the antenna system and the television receiver for all of the channel frequencies.

Among the systems proposed for attempting to achieve these results, are amplifiers embodying pentode vacuum tubes having tuned input and tuned output circuits, one for the low-frequency television band, and the other for the high-frequency television band. The user may switch between either the high- or the low-frequency tuned circuits, and he is required continuously to tune the circuits for each channel frequency. This tuning may be of the moving-core permeability type, or it may embody capacity tuning, sliding-brush inductance tuning, or similar expedients. These systems, however, are all subject to the disadvantage that the user must switch the device when he changes from a channel frequency in the low-frequency television band to a channel frequency in the high-frequency television band, or vice versa. A further disadvantage resides in the fact that the user must continuously tune this system for each particular channel frequency. Impedance matching with the aid of such circuits, furthermore, is optimum at only a single channel frequency.

Another proposal has involved the use of separate coils for each particular channel frequency that are fix-tuned for the individual channel frequencies. While such a system may be better matched to the antenna system than the previously described continuous-tuning systems, it requires the user to switch to the different fixed-tuned circuits in order to receive the different channel frequencies. This puts a serious limitation on the places or locations at which the amplifier may be connected since the user must operate the switching. This type of system, moreover, is expensive and complicated.

Still a further proposal is to use a first broad- or wide-band circuit for the complete low-frequency band, and a second broad- or wide-band circuit for the high-frequency band. This system too, however, requires the switching by the user from the low to the high band, or vice versa.

Another prior-art system involves the use of both a high-frequency band broadly tuned circuit, and a low-frequency band broadly tuned circuit, but obviates the necessity for switching by employing proper electrical lengths of artificial or actual transmission lines from the high- and low-frequency band circuits to the antenna system. A channel frequency lying within the low-frequency band, for example, will then be presented with a high impedance along the path leading to the high-frequency band broadly tuned circuit and a low impedance leading to the low-frequency band broadly tuned circuit. Similarly, a high-frequency band channel frequency will find a path of low impedance to the high-frequency band circuit and a path of high impedance to the low-frequency band circuit. Such systems, of course, require relatively critical transmission-line systems and special electrical components, and are relatively complex.

An additional approach to the problem has been to use distributive amplifiers having their input circuits along one transmission line and their output circuits along a second transmission line to provide substantially uniform response to an extremely wide band of frequencies. Such devices, of course, are very expensive and are not ideally adapted for use as television amplifier or booster stages since they offer no signal discrimination, being broadly responsive to all frequencies, including even those outside the high- and low-frequency television bands.

Another object of the present invention, therefore, is to provide a new and improved system for simultaneously boosting, amplifying or pre-amplifying all frequencies lying within the low-frequency and the high-frequency television bands that shall not be subject to the disadvantages above-mentioned.

A further object is to provide a single electric circuit that presents a substantially uniform low-impedance response or resonant response to a plurality of separated relatively wide frequency bands, and a high-impedance response or high attenuation to frequencies outside the said frequency bands.

An additional object is to provide a radio-frequency amplifying system for producing a substantially uniform broad- or wide-band response to a band of frequencies lying within the range of from about 54 to 88 megacycles, and a substantially uniform broad- or wide-band response to frequencies lying within a band of from about 174 to 216 megacycles, and a high-impedance response or high attenuation to all frequencies intermediate the said bands and on either side of the said bands.

Still a further object is to provide a radio-frequency amplifying system of this character that requires no frequency-band switching and no other adjustments by the user, and that is inexpensive to manufacture and easy to install.

Another object, still, is to provide a device of this character employing standard electrical parts with no special components, and utilizing triode vacuum tubes that not only produce improved gain per unit band width over pentode amplifiers, but permit the manufacture of smaller and less costly units, because two triodes may be embodied in a single-tube envelope.

A further feature of the invention resides in the providing of a unit that may be placed by the unskilled user himself directly at the antenna system, or directly at the receiver, or at any point remote from the receiver, along the antenna-system transmission line.

Another feature resides in the application of the present invention to television and similar distribution systems.

Other and further objects will be explained hereinafter and will be more particularly pointed out in the appended claims.

In summary, the present invention relates to a system for resonantly amplifying two relatively narrow separated radio-frequency bands and further resonantly amplifying one or more relatively narrow radio-frequency bands overlapping each of the said two bands to produce resultant amplified, separated, relatively wide radio-frequency bands. Preferred types of overlapping response and circuits for producing the same are hereinafter treated in detail as are advantageous circuit sub-combinations. The application of devices constructed in accordance with the present invention to television and similar distributing systems is also discussed.

Figure 2:
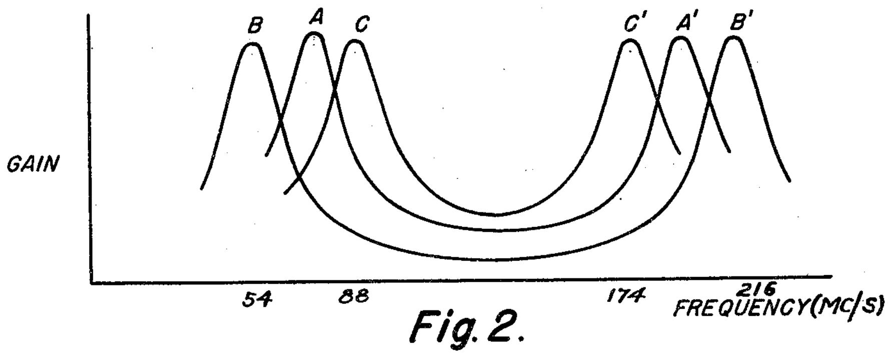
Figure 3:
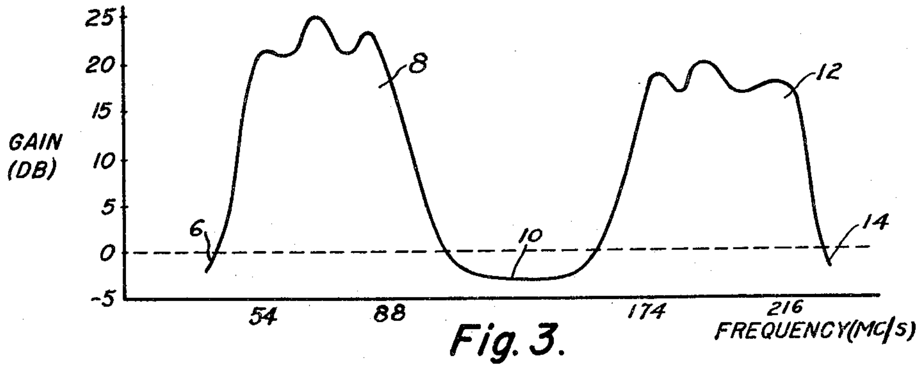
Figure 4:
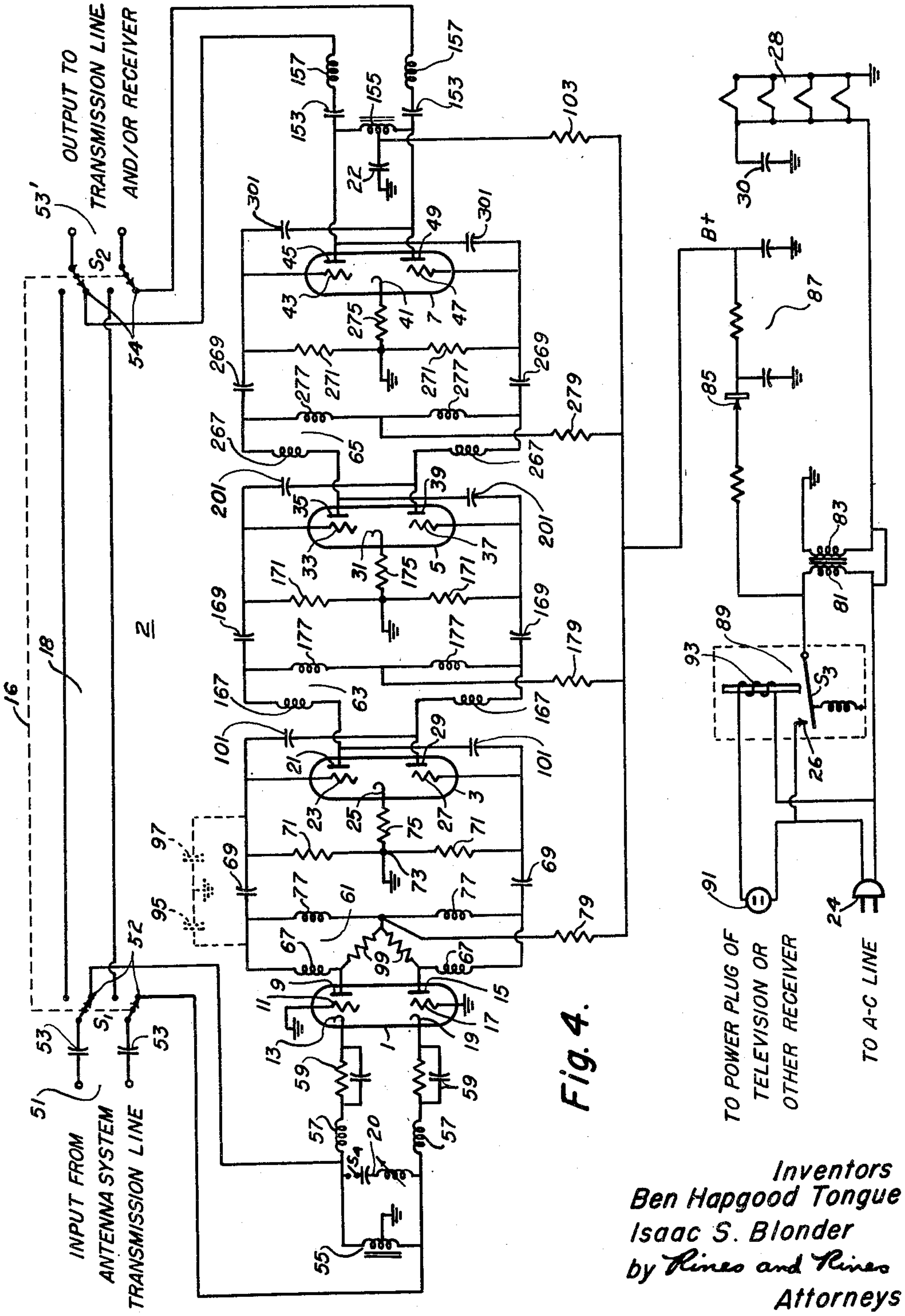
Figure 9:
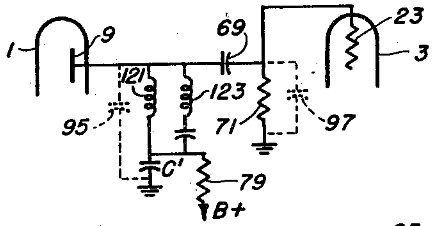
Figure 10:
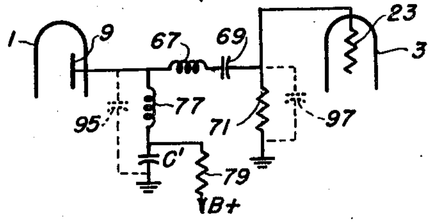
Figure 11:
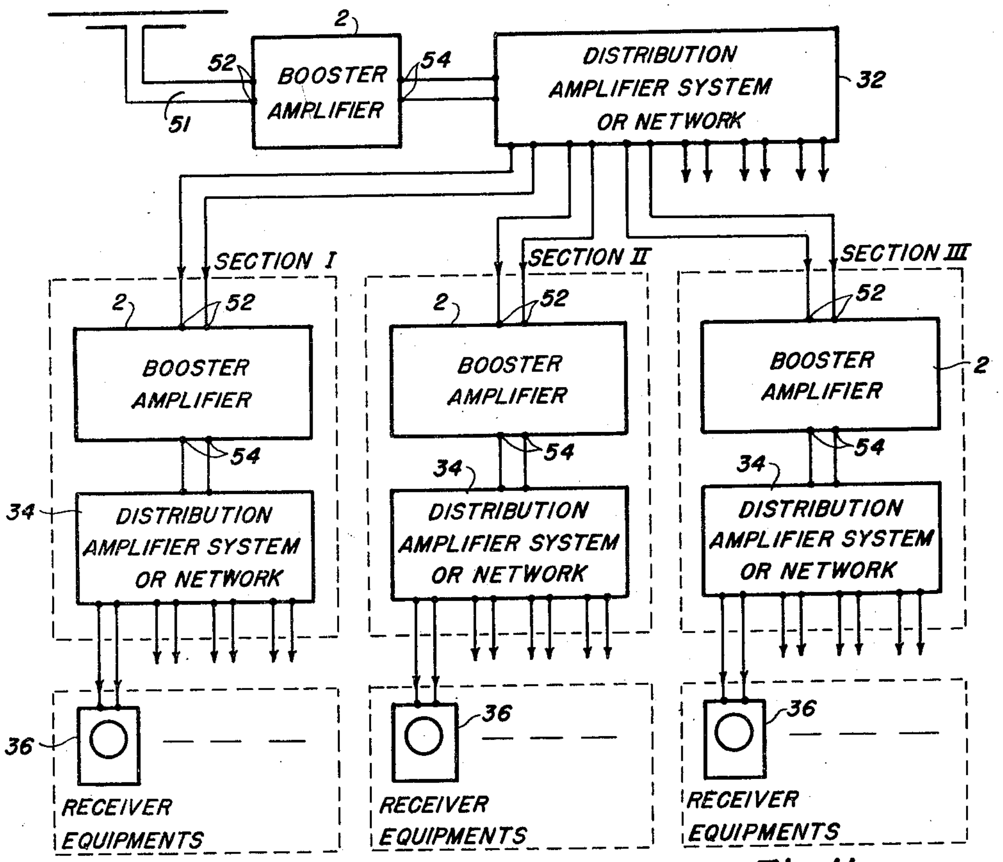
Figure 12:
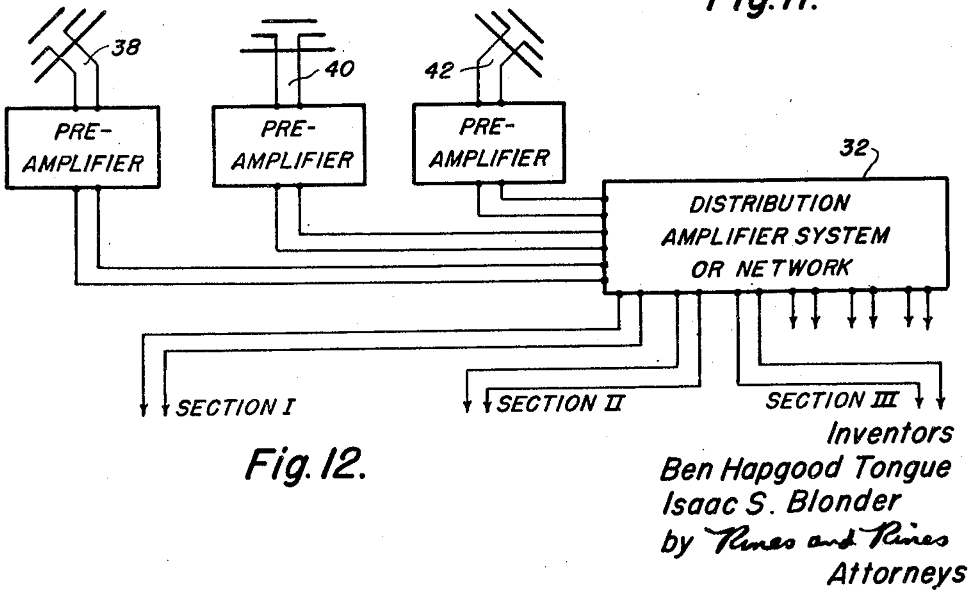

The invention will now be described in connection with the accompanying drawings Fig. 1 of which is a graph displaying an idealized desired response to two separated wide radio-frequency bands; Fig. 2 is a graph illustrating the combination in accordance with the present invention of a plurality of overlapping resonant-circuit responses; Fig. 3 is a graph of the resultant or overall response produced by the combination of the individual circuit responses shown in Fg. 2; Fig. 4 is a schematic circuit diagram of a preferred apparatus for producing the over-all response llustrated in Fig. 3; Figs. 5 to 10 are schematic partial circuit diagrams illustrating various modified networks that may be employed in the circuit of Fig. 4; and Figs. 11 and 12 are block diagrams of the application of the circuit of Fig. 4 to a television distributing system.

The fundamental problem with which the present invention is concerned is to produce, in a simple electric system, a frequency response that approximates the idealized or theoretical response graphically illustrated in Fig. 1. This graph illustrates the response, gain or output of an idealized electric system, plotted along the ordinate, as a function of frequency, plotted along the abscissa. The idealized system does not respond to any frequencies below 54 megacycles. At this frequency, however, the system responds with maximum gain, as indicated by the steeply rising left-hand edge of the curve D. This maximum response, moreover, is constant throughout a band of frequencies, corresponding to the low-frequency television band, up to 88 megacycles, beyond which the response suddenly drops again to zero, as shown by the steeply falling right-hand edge of the curve D. The electric system has zero response to all frequencies above 88 megacycles until 174 megacycles is reached. At this frequency, maximum gain or response is again produced, as indicated by the steep left-hand edge of the curve D′, and is maintained over the complete high-frequency television band up to 216 megacycles. Beyond 216 megacycles, the system again has zero response, as shown by the steeply falling right-hand edge of the curve D′.

It is not, of course, possible to obtain, in actual practice, a response of the type idealized in the curves D—D′. It has been found, however, that an excellent practical approximation of this response may be produced with the aid of a plurality of properly connected multiply resonant, preferably doubly resonant, circuits.

As an illustration, the response of a double-tuned circuit is illustrated at A—A′ in Fig. 2, the circuit being resonant and therefore producing a maximum or peak gain at a frequency intermediate at 54 to 88 megacycle band, and also a peak of substantially the same magnitude at a widely separated frequency intermediate the 174 to 216 megacycle band. A single double-resonant circuit of this sort, of course, can by no means approximate the broad- or wide-band response to all of the frequencies in the said high-frequency and low-frequency television bands shown in Fig. 1. If, however, radio-frequency energy is passed through such a circuit, and then into a circuit having a different double-resonant response, such as shown by the curve B—B′, Fig. 2, the resonant peaks of which occur at different frequencies intermediate the low-frequency and high-frequency television bands, the response curve of the second circuit will overlap that of the first circuit, somewhat in the manner of conventional staggered tuning, though employing double resonance responses. A broader overall or resultant response to frequencies in both the high- and low-frequency television bands may thus be produced. In some cases, this may be adequate for producing an approximation to response curves such as D—D′ of Fig. 1, but it has been found preferable, in connection with present-day television channels, to employ at least still a third double-resonant circuit the response of which is indicated by curve C—C′ in Fig. 2. This third circuit is resonant to frequencies in the low- and high-frequency bands that are different from the resonant frequencies of the circuits the responses of which are indicated in curves A—A′ and B—B′. The response curve C—C′ therefore overlaps the response curves A—A′ and B—B′. It has been found that the overall or resultant response of such a system is of the nature illustrated in Fig. 3, which has proved to be an excellent approximation to the desired idealized response D—D′ of Fig. 1.

It remains to explain what type of double-peaked or double-resonant circuits may be employed and how they may be connected to produce an overall or resultant response of the type shown in Fig. 3.

A preferred system embodying appropriate double-tuned circuits is illustrated at 2 in Fig. 4. While the system of Fig. 4 will hereinafter be discussed in connection with television reception, it is to be understood that this is illustrative only, the invention being broadly applicable to any type of system of the nature described. The embodiment of Fig. 4 employs four double triode vacuum tubes shown at 1, 3, 5 and 7. For purposes of illustration, the tubes are schematically shown as vertically disposed so that one section of each double triode may be referred to as the upper triode section, and the other section, as the lower triode section. The upper triode section of the double triode emplifier apparatus 1, for example, is provided with a plate or anode 9, control grid 11, and a cathode 13. The lower section of the double triode 1 is provided with a plate or anode 15, a control grid 17 and a separate cathode 19. The double triode amplifier apparatus 3 is similarly provided with an upper triode section comprising a plate or anode 21, a control grid 23 and a cathode 25, and the lower triode section embodies the same cathode 25, a control grid 27 and a plate 29. The double triode amplifier apparatus 5 is similarly provided with a common cathode 31, and upper- and lower-triode-section control grids and plates or anodes 33, 35 and 37, 39, respectively. The double triode amplifier apparatus 7 is also provided with a common cathode 41 and respective upper- and lower-triode-section control grids and plates or anodes 43, 45 and 47, 49. It is to be understood, of course, that separate triodes in separate envelopes may be employed instead of the above-described double triode tubes, though such a construction is considerably more expensive and space-consuming than the system illustrated in Fig. 4. Other types of tubes besides triodes may also be employed, but one of the features of the present invention, hereinafter discussed, resides in the use of triodes.

The pairs of upper and lower sections of each of the double triodes 1, 3, 5 and 7 are connected in push-pull. Radio frequency energy from an antenna system, for example, is fed in anti-phase from the terminals 51, representing any desired point along the antenna system transmission line, to the input circuits of the upper and lower triode sections of the tube 1, as will later be explained. The resulting outputs in the plate circuits of the first pair of push-pull-connected upper and lower triode amplifier stages 1 contain, therefore, anti-phase or push-pull signals, that, in turn, are fed to the corresponding input circuits of the second pair of push-pull-connected upper and lower triode amplifier stages 3. The push-pull outputs of the triode amplifier stages 3 are similarly fed to the corresponding input circuits of the third pair of push-pull-connected upper and lower triode amplifier stages 5. The push-pull output signals of the triode amplifier stages 5 are, in turn, similarly fed to the corresponding input circuits of the fourth pair of push-pull-connected upper and lower triode amplifier stages 7, and the push-pull outputs of the triode amplifier stages 7 are, in turn, fed to the output terminals 53′, for connection ultimately to a receiver, such as the conventional present-day television receiver.

Referring now to the requirements of the input circuits of the first double triode 1, the circuits must couple the radio-frequency signals received by an antenna system and fed along a transmission line, such as, for example, a 300-ohm line, to the upper and lower sections of the double triode 1. These input circuits should match the input signal from the antenna system and the transmission line to the tube 1 at both the television high-frequency and low-frequency bands, thereby to maintain a good signal-to-noise ratio. The input circuits of the tube 1, therefore, preferably comprise a broad- or wide-banded electric circuit, broad or wide enough to pass all the frequencies of both the high-frequency and low-frequency bands.

The upper and lower terminals 51 represent any point along the transmission line, such as a point directly at the antenna system, a point between the antenna system and the receiver, or a point directly at the receiver. The user may, though entirely unskilled, install the circuits of the present invention, by, for example, cutting out the section 18 of transmission line and connecting in its place the circuits of Fig. 4. This is schematically illustrated as accomplished with the aid of switches $S_1$ and $S_2$, shown ganged at 16. Switches $S_1$ and $S_2$ may, indeed, be actually employed if it is desired to provide a means for inserting or removing the circuits of the present invention at will. As an illustration, the point 51 along the transmission line may originally be connected by a further length of transmission line 18 to a point 53′ at which the receiver may be directly connected or at which a further length of transmission may be connected to connect, ultimately, with a receiver. With the switch $S_1$ in its down position, as shown, the terminals 51 are connected through direct-current blocking condensers 53 to the input upper and lower terminals 52 of the circuits of Fig. 4. The terminals 52 are connected to opposite ends of an iron core grounded center-tap choke coil 55. The choke coil 55 provides tight magnetic coupling such that the signal appearing at the upper and lower terminals 51 and fed through the upper and lower blocking condensers 53, is balanced with respect to the grounded center-tap of the choke 55. The upper and lower ends of the choke 55 are connected through coils 57 and resistance-capacitance networks 59 to the respective cathodes 13 and 19 of the upper and lower triode sections of the double triode 1. The control grids 11 and 17 of the upper and lower triode sections are grounded, and thus are effectively connected to the center-tap of the choke coil 55. The choke coil 55 is adjusted so that at channel frequencies in the low-frequency band, it will resonate broadly with the capacitance provided by the switch $S_1$ and the grid-cathode capacitance of the upper and lower triode sections of the double triode 1. For channel frequencies located in the high-frequeny band, on the other hand, the values of the coupling coils 57 are adjusted to present, in conjunction with the capacitance of the switch $S_1$ and the grid-cathode capacitance of the upper and lower triode sections of the double triode 1, a $\pi$-type coupling network having an input impedance of about 300 ohms, corresponding to the before-mentioned 300-ohm transmission line connected to the terminals 51. Transmission-line reflections are thus minimized. The direct current coupling condensers 53, moreover, are adjusted to values such that they effectively produce a type of series resonance in connection with the coils 57, which is not strictly series resonance because of the presence of the coil 55, to produce best results in the low-frequency band. By this expedient, an excellent compromise is effected that permits good matching of the antenna system and transmission line to the tube 1 for all frequencies lying within both the low- and the high-frequency bands.

The use of the upper and lower grounded-grid triode sections introduces a low noise figure and simplifies the problem of matching the tube 1 to the antenna system. The input impedance of such tubes is approximately equal to the inverse of the transconductance of the tubes, which in turn, is of the order of 150 ohms, so that a balanced input impedance of 150 ohms to ground is presented for both the upper and lower sections of the tube 1, providing a good match for the 300-ohm line before referred to.

It is in the output circuits of the first pair of upper and lower push-pull-connected triode amplifier stages 1 that a pair of similar coupling networks 61 are provided that produce similar plural or double-resonance effects, before referred to. The output-circuit coupling networks 61 of the triode amplifier stages 1, for example, may be of such a nature as to produce the type of double-resonance response A—A′, illustrated in Fig. 2, with the peaks of the two relatively narrow separated frequency bands A and A′ occurring at frequencies lying intermediate the low- and high-frequency bands, respectively. The outputs of the networks 61 are then fed to the second pair of upper and lower push-pull-connected triode amplifier stages 3 in the output circuits of which a further pair of similar coupling networks 63 are provided. This further pair of coupling networks 63 are, in turn, of such a nature as to provide a further double-resonant response, say, for example, of the type illustrated at B—B′ in Fig. 2, the peaks of the two relatively narrow separated frequency bands B and B′ occurring at the lower and upper limits of the low- and high-frequency bands, respectively. The frequency bands B and B′ thus each overlap one side of the respective bands A and A′. The one side of the band A that is overlapped is shown in Fig. 2 as the opposite side from the one overlapped side of the band A′, the band B overlapping the lower or left-hand side of the band A, and the band B′ overlapping the upper or right-hand side of the band A′. The overall amplified response produced, therefore, by the circuits 1–61 and 3–63, representing the combination of the responses illustrated by the curves A—A′ and B—B′, is then fed to the third pair of push-pull-connected triode amplifier stages 5 in the output circuits of which still a further pair of double-peak coupling networks 65 is provided. The coupling networks 65 may have the response illustrated at C—C′, the peaks of the two relatively narrow separated frequency bands C and C′ occurring at the upper end of the low-frequency band and at the lower end of the high-frequency band, respectively, overlapping one side, namely the upper side, of the band A and one side, namely the lower side, of the band A′. In this manner, the resultant or over-all response in the output circuit of the fourth pair of push-pull-connected amplifier stages 7, into which the anti-phase outputs of the coupling networks 65 are fed, is of the nature illustrated in Fig. 3, providing broad- or wide-band response to all the low-frequency band channel frequencies and to all the high-frequency band channel frequencies, but highly attenuating all frequencies external to the said high- and low-frequency bands.

It is not necessary, however, that the responses of the networks be in the order above described, or that they be of the particular nature described. The networks 63, for example, may have resonant peaks at the low end of the low-frequency band and at the low end of the high-frequency band. Similarly, the response of the networks 65, instead of being peaked at the high end of the low-frequency band, and the low end of the high-frequency band, may be peaked at the high end of the low-frequency band and at the high end of the high-frequency band. Many other combinations and permutations of double-resonant responses may, of course, be employed. It has been found preferable for the television bands, however, to tune the networks 61, 63, 65 to provide the type of double-peaked staggered responses illustrated in Fig. 2.

It is next in order to explain the details and tuning of the circuits that produce these plural-resonance results. The plates or anodes 9 and 15 of the first pair of upper and lower push-pull-connected triode amplifiers 1, are respectively shown connected through coils 67 and coupling condensers 69 to the control grids 23 and 27 of the second pair of upper and lower push-pull-connected triode amplifiers 3. The condensers 69 are also connected through loading resistors 71 to a common grounded terminal 73 to which the common cathode 25 of the amplifiers 3 is also connected by a cathode load 75. The ends of the coupling coils 67 that are connected to the condensers 69 are also series-connected together through a pair of further coils 77 the junction of which is connected through a loading resistor 79 to the power supply source of plate or B+ voltage. This B+ voltage may be produced by feeding alternating current voltage from an alternating-current line through a plug 24 to a transformer winding 81 that may be connected, on one side, in series with a cooperating filament transformer 83, to ground. The winding 81 may be connected on the other side to a rectifier 85 such as, for example, a selenium-type dry rectifier, and through a $\pi$-type resistance-capacitance filter network 87 to produce the B+ voltage. The ungrounded side of the filament winding 83 may supply filament current for the filaments 28 of the tubes 1, 3, 5 and 7, as is well known in the art. Any other conventional plate and filament supply may, of course, be employed. The energization, moreover, of the electric system of Fig. 4 may be effected synchronously with the turning on of the television or other receiving set by means of a relay, such as, for example, the relay 89. Inserting the plug 24 in the alternating-current line and connecting the television or other receiver to the socket 91 will provide for energizing the receiver when it is turned on. A spring-controlled switch $S_3$ of the relay 89 is normally held open, however, so that the alternating-current voltage from the alternating-current line can not at first energize the winding 81, and therefore, the tubes 1, 3, 5 and 7 of the electric system of Fig. 4 are normally ineffective. When the television or other receiver is turned on, as above described, however, current flows through the relay coil 93 of the relay 89, closing the switch $S_3$ into contact with a contactor 26, and thereby energizing the winding 81 to provide filament and B+ voltages for the stages 1, 3, 5 and 7, thus rendering this system automatically effective when the television or other receiver is turned on.

Since the output circuits of the first pair of amplifier stages 1 are symmetrical with respect to ground, it will suffice to explain only the performance of one of the stages, say the upper triode section, since the operation of the other stage or section is the same, though in anti-phase. It will be noted, first, that no neutralizing condensers are employed in the output circuits of the amplifier stages 1. The use of the grounded grid input circuits, before described, obviates the need for neutralization. There are shown in the output circuit of the upper triode amplifier of the stages 1, two capacitors 95 and 97, connected to ground. These capacitors are dotted since they represent, respectively, the effective plate-to-grounded grid capacitance of the upper section of the double triode 1, and the grid-to-ground cathode input capacitance of the upper section of the double triode 3. The capacitance values of the capacitors 95 and 97 are, for triodes, roughly of the same order of magnitude. The inductance of the coil 67, however, is made smaller than the inductance of the coil 77. For frequencies lying in the low-frequency band, the reactance of the coil 67 is adjusted or tuned to be small compared to the reactance of the capacitance 95 so that the capacitance 95 and the capacitance 97 effectively resonate in parallel with the larger inductance 77, producing a first peak resonance somewhere in the low-frequency band. For the first stages 1, this peak is preferably adjusted, as before described, to a value intermediate the limits of the low-frequency band, say at about 65 megacycles, as illustrated at A in Fig. 2. For frequencies in the high-frequency band, on the other hand, the reactance of the inductance 77 is much greater than the reactance produced by the capacitance 97, so that the capacitance 95 operates with the inductance 67 and the capacitance 97 as a mis-terminated low-pass filter having its characteristic peak just below its filter cut-off frequency adjusted or tuned preferably to occur somewhere intermediate the high-frequency band, say, at about 200 megacycles, as shown at A′, Fig. 2. The mis-termination of this effective low-pass filter arises from the fact that the grid-to-cathode resistor 71 of the upper section of the second stages 3 is made of value higher than the impedance of the elements 67, 97 and 95 in the high-frequency band. In these type of networks, moreover, the low- and high-frequency tuned resonant peaks are of substantially the same magnitude. The networks are rather heavily loaded, having a low Q, and their input circuits, comprising the triode stages 1, present a high impedance compared to the impedance of the networks, the stages 1 operating as substantially constant current sources.

In the above discussion, the coupling condensers 69 were ignored. This is justified since the capacity of these condensers is very much larger than the value of the capacitances 95 and 97. There is thus produced for application between the control grid 23 and the cathode 25 of the upper triode section of the amplifier stages 3, the resonant amplification of two relatively narrow separated radio-frequency bands, one peaked at about 65 megacycles, and the other peaked at about 200 megacycles.

The only other elements present in the output circuits of the stages 1, are the plate load resistors 99 connected between the respective plates 9 and 15 of the upper and lower sections of the double triode 1 and the before-mentioned junction between the coils 77 at which the B+ voltage is applied. These resistors 99 load the plate circuits of the pair of upper and lower push-pull triode amplifiers 1, reducing the Q thereof and also reducing the tendency for regeneration.

The networks 61 are connected to the relatively high-impedance input circuits of the second pair of push-pull amplifier stages 3, as before described. The networks 63 in the output circuits of the second pair of push-pull amplifier stages 3 are very similar to the networks 61 just described, embodying coils 167 and 177, respectively corresponding to coils 67 and 77. The condensers 169, resistors 171, 175 and 179 also correspond, respectively, to the condensers 69, resistors 71, 75 and 79 of the output circuits of the stages 1. The values of the coils 167 and 177 are adjusted to somewhat different values, however, than the coils 67 and 77, to provide the low-frequency band resonance at preferably a frequency near the lower extremity of the low-frequency band, and the high-frequency band peak at preferably a frequency near the upper extremity of the high-frequency band. The low-frequency peak, for example, may be caused to occur at a frequency of about 54 megacycles, as shown at B, Fig. 2, and the high-frequency peak may occur at about 216 megacycles, as illustrated at B'. The networks 63 are not heavily loaded and have a higher Q than the networks 61. Neutralizing condensers 101 are employed between the control grids 23 and 27 and the plates or anodes 21 and 29 of the second pair of push-pull amplifier stages 3 since these stages are not operated as grounded-grid amplifiers like the first pair of stages 1, but, rather, as grounded-cathode push-pull amplifiers. The common cathode load 75, moreover, is preferably not by-passed since it is desired to maintain the outputs of the upper and lower amplifiers of the stages 3 at substantially the same amplitude at all times.

The output circuits of the third pair of push-pull-connected amplifier stages 5 is of precisely the same nature as the output circuits of the amplifier stages 3, having coils 267 and 277, condensers 269 and 201, resistors 271, 275 and 279, respectively corresponding to coils 167 and 177, condensers 169 and 101, resistors 171, 175 and 179 of the output circuits of the amplifier stages 3. The values of the coils 267 and 277, however, are somewhat different than the values of the coils 167 and 177. This is in order to produce low-frequency resonant response at a point preferably near the upper extremity of the low-frequency band, say, a peak at about 88 megacycles, as shown at C, and high-frequency resonant response at a frequency near the lower extremity of the high-frequency band, say, at about 176 megacycles, as illustrated at C'. The networks 65 thus have a Q somewhere between the Q's of networks 61 and 63.

The overall effect or resultant of the resonant amplification by the successive circuits having the responses A—A', B—B' and C—C', above described, has been found to produce the wide-band characteristics illustrated in Fig. 3. Fig. 3 is a reproduction of an experimentally obtained characteristic curve of a system constructed as shown at 2 in Fig. 4 and adjusted and tuned as above described. The tube 1 was a 12AT7 double triode, and the tubes 3, 5, and 7 were 6J6 double triodes. Below about 54 megacycles, the gain of the system dropped sharply as indicated at 6. A high-gain response of from about 23 to about 26 decibels over the complete low-frequency band of from about 54 to about 88 megacycles was produced as shown at 8. Beyond about 88 megacycles, the system highly attenuated radio-frequency energy, as shown at 10. About 174 megacycles, the system again responded with high gain, and providing gains of from about 18 to about 21 decibels over the high-frequency band, as shown at 12, rapidly attenuating higher frequencies as indicated at 14. This, as before mentioned, has been found to produce a most satisfactory practical approximation of the theoretical response D—D' illustrated in Fig. 1.

The output circuits of the fourth pair of push-pull-connected amplifier stages 7 comprise a broad- or wide-band resonant electric circuit quite similar to the input circuits of the first pair of push-pull-connected stages 1. The problems involved, indeed, are quite similar in that it is desired to present an appropriate output impedance at the terminals 54 and 53' for connection either to a further length of transmission line, or directly to the receiver. The choke coil 155 connected between the plates 45 and 49 of the upper and lower triode amplifiers 7 corresponds to the choke coil 55 previously discussed in connection with the input circuit of the stages 1.

The coupling condensers 153 and the series coils 157 similarly correspond in purpose and function to the condensers 53 and coils 57 discussed in connection with the input circuits of the push-pull amplifier stages 1. The balanced choke coil 155 resonates in substantially the center of the low-frequency band. The coupling condensers 153 and the coils 157 resonate, also, in conjunction with the coil 155, at the low-frequency band to prevent voltage division action and to provide a good impedance match at the terminals 53. The coils 157, in conjunction with the capacitance of the switch $S_2$ and the output capacitance of the tube 7, form a $\pi$-type coupling network that is adjusted to provide maximum output voltage for a 300-ohm load, thereby providing good matching at the high-frequency band, as well. Plate or B+ voltage is applied through a dropping resistor 103 to the center tap of the choke coil 155 for the final stages 7, and the said center tap is by-passed by a condenser 22 to ground. With the switch $S_2$ in the down position, as shown, therefore, there is presented at the terminals 54 and 53' an appropriate matching impedance for both the low- and high-frequency bands. Neutralizing condensers 301 are also provided in these triode stages.

If the system illustrated in Fig. 4 is to be connected directly at the antenna or at some intermediate point along the transmission line remote from the receiver, furthermore, a pair of loading resistors, not shown, may be connected in series across the switch $S_2$ between the terminals 54. These resistors may, for example, each have a value of 150 ohms for presenting a match to a 300-ohm transmission line connected to the terminals 53'.

If, on the other hand, it is desired to connect the system illustrated in Fig. 4 directly to the receiver, such loading resistors would not be necessary. In some receivers, however, the antenna and transmission-line impedances are used in connection with the receiver input impedance to provide proper receiver bandwidth. In such cases, loading resistors would be desirable. The amplifier stages 7 are operated, moreover, as low-gain stages, and, since the loading resistance provided by the receiver connected to the terminals 53' is low, the amplifier stages 7 have a substantially flat response over the complete high and low-frequency bands.

It is to be understood, of course, that the type of double-peaked coupling networks 61, 63 and 65, discussed in connection with the output circuits of stages 1, 3 and 5 may be used also as the input circuit of the amplifier stages 1 or as the output circuit of the amplifier stages 7, though it is deemed preferable to employ the type of broadly resonant circuits illustrated in Fig. 4 at these locations. There are, furthermore, other types of plural or double-tuned coupling networks than the types illustrated at 61, 63 and 65 that may be employed to couple the stages 1, 3, 5 and 7. Since the upper and lower sections of each of these push-pull systems are symmetrical, Figs. 5, 6, 7, 8, 9 and 10 illustrate in connection with the upper sections only of the stages 1 and 3, other forms of double-peak coupling networks that may be employed.

Figure 5:
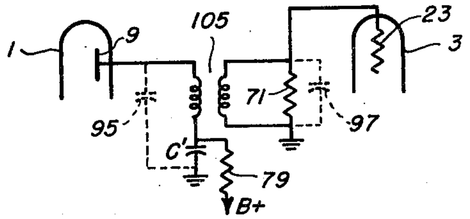
Figure 6:
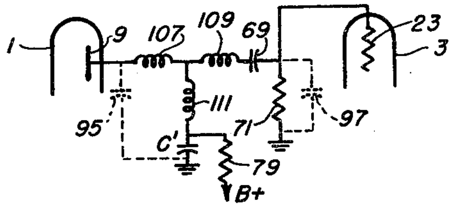
Figure 7:
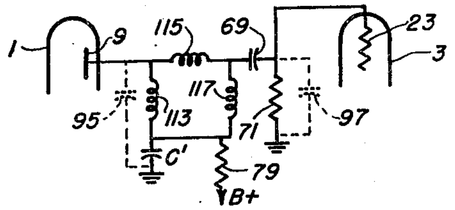
Figure 8:
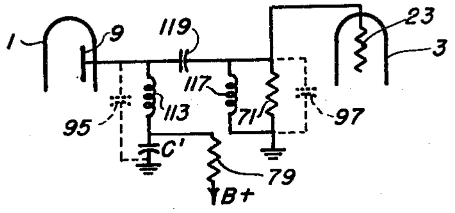

In Fig. 5, the plate 9 of the upper section of the tube 1 is shown coupled to the control grid 23 of the upper section of the tube 3 by a magnetically coupled double-tuned transformer 105 that has been adjusted so that its primary and secondary inductance windings have been over-coupled, producing the characteristic double-peak response of such over-coupled networks. The dotted capacitors 95 and 97 have the same significance as in Fig. 4. The capacitor C' is an alternating-current by-pass which may be employed in connection with the application of the B+ voltage. The circuit of Fig. 5 is not, however, very practical since it is difficult to get the transformer windings coupled close enough for many applications of the present invention. In Fig. 6, a T-type network comprising series inductances 107 and 109 and a branch inductance 111 is illustrated coupling the upper sections of the triodes 1 and 3. Such a T-type inductive coupling network may be designed to be fully equivalent to the over-coupled network of Fig. 5, producing the desired double-peaked response. In Fig. 7, a circuit fully equivalent to that illustrated in Fig. 6 is shown, comprising appropriate inductive coupling elements 113, 115 and 117 connected in $\pi$ to produce the desired double-peaked response. In Fig. 8, another equivalent double-tuned coupling network is illustrated comprising, instead of the series inductor 115 of Fig. 7, a capacitive branch 119. Such a circuit may be used to widen the high-frequency response and to cut down on the width of the low-frequency response, if desired. In Fig. 9, still another type of coupling network is illustrated that may produce double-peak resonance comprising a two-terminal four-element circuit having an inductor 121 shunted by a series inductance-capacitance combination 123 to provide two anti-resonance peaks. In Fig. 10, a coupling network very similar to that illustrated in Fig. 4 is shown, but with the coil 67 on the other side of the shunt inductance 77 between the shunt inductance and the coupling condenser 69. This network is quite similar to that employed in the input circuits of the stages 1 and the output circuits of the stages 7.

Every television channel frequency, therefore, and only such channel frequencies, lying between the limits of both the low- and high-frequency television bands, has been amplified by the stages 1, 3, 5 and 7 in the manner illustrated in Fig. 3, providing for the simultaneous amplification of all of the television channels without switching mechanisms or other undesirable circuitry. If, moreover, greater output is desired, or if a more flat wide-band response is desired than is produced in Fig. 3, one or more further pairs of push-pull amplifying stages may be inserted before the tube 7, provided, for example, with further pairs of double-peaked resonant networks having responses lying between the peaks A, B, C and A′, B′, C′. If strong interfering signals are prevalent, furthermore, wave traps such as the selectively tunable series condenser-inductance circuit 20 may be connected across the input circuits to the stages 1, or at other locations, as by a switch $S_4$ to eliminate the interference.

The electric system 2 of Fig. 4 permits the practical simultaneous distribution of all television signals from a common antenna system along a plurality of separate paths, as for distributing television programs in hotels, apartment houses, homes, factories, laboratories and the like. In accordance with present-day distribution systems, the signals received by the antenna system, which may comprise separate antennas oriented for best reception of the individual channel frequencies or broad-band antennas, are amplified near the antenna with separate channel amplifiers, distributive amplifiers or low-band and high-band amplifiers of the type previously discussed. The amplified frequencies are mixed in a linear circuit at relatively low voltage levels to prevent intermodulation and distortion of the picture signals. The low voltage level signals are fed along a common transmission line to distribution boxes comprising either a plurality of isolation amplifier tubes, one corresponding to each television receiver to be fed, or to a resistor network from successive taps of which the receivers are fed.

The chief disadvantages of these distribution systems reside in the loss of signal strength along the transmission line and in the distribution boxes where, as before related, low voltage levels must be maintained. Boosters or amplifiers involving switching or tuning cannot remedy the situation. This is because the boosters or amplifiers must be used on the antenna side of the distribution box in order to get the best signal-to-noise ratio. If so located, of course, the different users to whom the distribution system distributes the signals cannot simultaneously tune in to different channel frequencies, but all the users are required to listen to the same program. Distributive amplifiers are also not a solution to the problem because of their high cost and because of their susceptibility to interference. The boosters employing high-frequency and low-frequency band circuits with appropriate artificial or physical transmission line devices also do not lend themselves to advantageous use in the solution of this problem since distribution systems involve linearly mixing together the channel frequencies.

With the aid of the present invention, however, these disadvantages are obviated. Referring to Fig. 11, an antenna system 51, perhaps of the broad-band type, feeds the input terminals 52 of a booster amplifier electric system 2 of the type shown in Fig. 4. The output terminals 54 of the electric system 2 are fed to the conventional distribution amplifier or network 32, above described, from which all of the television channels are fed along a plurality of separate paths. Three such paths are illustrated at section I, section II and section III, and these may, for example, represent different floors of a hotel. Each section is provided with a further booster amplifier electric system 2 preceding a further distribution amplifier system or network 34 from which individual lines may be run to individual receiver equipments, such as 36. In this manner, a very large number of receivers may be simultaneously serviced with all of the television channel frequencies. The signal-to-noise ratio is maintained high since the electric system 2 of the present invention raises the overall signal level. All of the users are able, moreover, at the same time, to obtain the channel frequencies they individually desire. The reception they obtain, furthermore, closely duplicates the performance that each receiver 36 would produce if fed from a separate antenna, though actually only a single antenna system is employed for all the receivers. The losses in the distribution systems, moreover, are compensated for by the electric systems 2, further maintaining a high signal-to-noise ratio.

If desired, separate antennas, with or without pre-amplifiers, may be employed, individually oriented, to obtain the best reception for the individual channel frequencies, as shown at 38, 40 and 42 in Fig. 12. The sections I, II and III of Fig. 12 are intended to be identical with those illustrated in Fig. 11.

Further modifications will occur to those skilled in the art, and all such are considered to fall within the spirit and scope of the present invention as defined in the appended claims.

What is claimed is:

1. An electric system for amplifying a plurality of separate radio-frequency signals within widely separated low and high radio-frequency bands having, in combination, a first tuned amplifying means comprising a first plural-resonant network connected with a first amplifier apparatus, the network being tuned to position one resonant peak of its plural-resonant response in the low radio-frequency band and a second resonant peak in the high radio-frequency band, a second tuned amplifying means comprising a second plural-resonant network connected with a second amplifier apparatus, the second network being tuned to position one resonant peak of its plural-resonant response in the low radio-frequency band and a second resonant peak in the high radio-frequency band but with the low and high radio-frequency-band peaks of the second network displaced respectively to one side of the said low and high radio-frequency band peaks of the first network in order that the plural resonant responses of the networks may overlap within the respective low and high radio-frequency bands, and means for connecting together the first and second amplifying means to produce simultaneously a resultant broad-band amplification in each of the low and high radio-frequency bands.

2. An electric system for amplifying a plurality of separate radio-frequency signals within widely separated low and high radio-frequency bands having, in combination, a first tuned amplifying means comprising a first double-resonant network connected with a first amplifier apparatus, the network being tuned to position one resonant peak of its double-resonant response to the low radio-frequency band and the second resonant peak in the high radio-frequency band, a second tuned amplifying means comprising a second double-resonant network connected with a second amplifier apparatus, the second network being tuned to position one resonant peak of its double-resonant response in the low radio-frequency band and the second resonant peak in the high radio-frequency band but with the low and high radio-frequency-band peaks of the second network displaced respectively to one side of the said low and high radio-frequency band peaks of the first network in order that the double resonant responses of the networks may overlap within the respective low and high radio-frequency bands, and means for connecting together the first and second amplifying means to produce simultaneously a resultant broad-band amplification in each of the low and high radio-frequency bands.

3. An electric system for amplifying a plurality of separate radio-frequency signals within widely separated low and high radio-frequency bands having, in combination, a first tuned amplifying means comprising a first plural-resonant network connected with a first amplifier apparatus, the network being tuned to position one resonant peak of its plural-resonant response in the low radio-frequency band and a second resonant peak in the high radio-frequency band, a second tuned amplifying means comprising a second plural-resonant network connected with a second amplifier apparatus, the second network being tuned to position one resonant peak of its plural-resonant response in the low radio-frequency band and a second resonant peak in the high radio-frequency band but with the low and high radio-frequency-band peaks of the second network displaced respectively to one side of and overlapping the said low and high radio-frequency band peaks of the first network, a third tuned amplifying means comprising a third plural-resonant network connected with a third amplifier apparatus, the third network being tuned to position one resonant peak of its plural-resonant response in the low radio-frequency band and a second resonant peak in the high radio-frequency band but with the low and high radio-frequency-band peaks of the third network displaced respectively to one side of the said low and high radio-frequency band peaks of either the first or second networks in order that the plural resonant responses of the networks may overlap within the respective low and high radio-frequency bands, and means for connecting together the first, second and third amplifying means to produce simultaneously a resultant broad-band amplification in each of the low and high radio-frequency bands.

4. An electric system for amplifying a plurality of separate radio-frequency signals within widely separated low and high radio-frequency bands of from about 54 to 88 megacycles and 174 to 216 megacycles, respectively, having, in combination, a first tuned amplifying means comprising a first plural-resonant network connected with a first amplifier apparatus, the network being tuned to position one resonant peak of its plural-resonant response in the low radio-frequency band of from about 54 to 88 megacycles and a second resonant peak in the high radio-frequency band of from about 174 to 216 megacycles, a second tuned amplifying means comprising a second plural-resonant network connected with a second amplifier apparatus, the second network being tuned to position one resonant peak of its plural-resonant response in the said low radio-frequency band and a second resonant peak in the said high radio-frequency band but with the low and high radio-frequency-band peaks of the second network displaced respectively to one side of the said low and high radio-frequency band peaks of the first network in order that the plural resonant responses of the networks may overlap within the respective low and high radio-frequency bands, and means for connecting together the first and second amplifying means to produce simultaneously a resultant broad-band amplification in each of the 54 to 88-megacycle low and the 174 to 216-megacycle high radio-frequency bands.

5. An electric system for amplifying a plurality of separate radio-frequency signals within widely separated low and high radio-frequency bands having, in combination, a first tuned amplifying means comprising a first pair of similar push-pull-connected plural-resonant networks connected with a first push-pull amplifier apparatus, the networks each being similarly tuned to position one resonant peak of its plural-resonant response in the low radio-frequency band and a second resonant peak in the high radio-frequency band, a second tuned amplifying means comprising a second pair of similar push-pull-connected plural-resonant networks connected with a second push-pull amplifier apparatus, the second networks each being similarly tuned to position one resonant peak of its plural-resonant response in the low radio-frequency band and a second resonant peak in the high radio-frequency band but with the low and high radio-frequency-band peaks of each of the second pair of networks displaced respectively to one side of the said low and high radio-frequency band peaks of each of the first pair of networks in order that the plural resonant responses of the pairs of networks may overlap within the respective low and high radio-frequency bands, and means for connecting together the first and second amplifying means to produce simultaneously a resultant broad-band push-pull amplification in each of the low and high radio-frequency bands.

6. An electric system for amplifying a plurality of separate radio-frequency signals within widely separated low and high radio-frequency bands having, in combination, an electric circuit broadly resonant to the said radio-frequency signals within the said low and high radio-frequency bands, a first tuned amplifying means connected to the electric circuit and comprising a first plural-resonant network connected with a first amplifier apparatus, the network being tuned to position one resonant peak of its plural-resonant response in the low radio-frequency band and a second resonant peak in the high radio-frequency band, a second tuned amplifying means comprising a second plural-resonant network connected with a second amplifier apparatus, the second network being tuned to position one resonant peak of its plural-resonant response in the low radio-frequency band and a second resonant peak in the high radio-frequency band but with the low and high radio-frequency-band peaks of the second network displaced respectively to one side of and overlapping the said low and high radio-frequency band peaks of the first network, a third tuned amplifying means comprising a third plural-resonant network connected with a third amplifier apparatus, the third network being tuned to position one resonant peak of its plural-resonant response in the low radio-frequency band and a second resonant peak in the high radio-frequency band but with the low and high radio-frequency-band peaks of the third network displaced respectively to one side of the said low and high radio-frequency band peaks of either the first or second networks in order that the plural resonant responses of the networks may overlap within the respective low and high radio-frequency bands, and means for connecting together the first, second and third amplifying means to produce simultaneously a resultant broad-band amplification in each of the low and high radio-frequency bands.

7. An electric system for distributing and amplifying a plurality of separate radio-frequency signals within widely separated low and high radio-frequency bands having, in combination, means for simultaneously distributing radio-frequency signals lying within the said bands along a plurality of separate paths; means connected in each of the separate paths comprising a first tuned amplifying means having a first plural-resonant network connected with a first amplifier apparatus, the network being tuned to position one resonant peak of its plural-resonant response in the low radio-frequency band and a second resonant peak in the high radio-frequency band, a second tuned amplifying means comprising a second plural-resonant network connected with a second amplifier apparatus, the second network being tuned to position one resonant peak of its plural-resonant response in the low radio-frequency band and a second resonant peak in the high radio-frequency band but with the low and high radio-frequency-band peaks of the second network displaced respectively to one side of the said low and high radio-frequency band peaks of the first network in order that the plural resonant responses of the networks may overlap within the respective low and high radio-frequency bands, and means for connecting together the first and second amplifying means to produce simultaneously a resultant broad-band amplification in each of the low and high radio-frequency bands; and means for further distributing the broad-band-amplified radio frequencies along a plurality of further separate paths.

8. An electric system having, in combination, four pairs of push-pull connected vacuum-tube amplifiers each amplifier having an anode, a control electrode and a cathode; an input circuit associated with the first pair of amplifiers for receiving through coupling condensers anti-phase signals and comprising means for applying the signals between the control electrode and the cathode of each of the first pair of amplifiers; three similar output circuits, one connected between the anodes of each of the first three pairs of amplifiers and the control electrodes of the next-following pair of amplifiers and each comprising a pair of similar networks having an inductance and a condenser connected in series circuit, further inductive means connected between the series connections of the said inductance and condenser of each network and provided with an intermediate connection to the positive terminal of a source of anode potential for the amplifiers, a pair of similar resistors connecting the control electrodes of each of the said next-following pair of amplifiers to ground and a further resistor connecting the cathodes thereof to ground; the networks of the output circuit of the first pair of amplifiers being tuned to produce a narrow resonant response at each of a first pair of widely separated frequencies; the networks of the output circuit of the second pair of amplifiers being tuned to produce a narrow resonant response at each of a second pair of widely separated frequencies, one overlapping each of the resonant responses of the output circuit of the first pair of amplifiers; and the networks of the output circuit of the third pair of amplifiers being tuned to produce a narrow resonant response at each of a third pair of widely separated frequencies each overlapping one of the before-mentioned resonant responses in order to produce a pair of widely separated relatively broad resultant frequency responses; similar neutralizing capacitances connected betweeen the control electrode of each of the amplifiers of the second, third and fourth pairs of amplifiers and the anode of the other amplifier of the corresponding pair of amplifiers; the fourth pair of amplifiers having an output circuit comprising a pair of similar networks each having a series-connected inductance and capacitance and a shunt-connected further inductance provided with an intermediate connection to the said positive terminal of the source of anode potential.

9. An electric system having, in combination, four pairs of push-pull connected vacuum-tube amplifiers each amplifier having an anode, a control electrode and a cathode; an input circuit associated with the first pair of amplifiers for receiving through coupling condensers anti-phase signals and comprising means for applying the signals between the control electrode and the cathode of each of the first pair of amplifiers, the input circuit being tuned broadly to respond to a wide range of frequencies including a pair of widely separated broad radio-frequency bands; three similar output circuits, one connected between the anodes of each of the first three pairs of amplifiers and the control electrodes of the next following pair of amplifiers and each comprising a pair of similar networks having an inductance and a condenser connected in series circuit, further inductive means connected between the series connections of the said inductance and condenser of each network and provided with an intermediate connection to the positive terminal of a source of anode potential for the amplifiers, a pair of similar resistors connecting the control electrode of each of the said next following pair of amplifiers to ground and a further resistor connecting the cathodes thereof to ground; the networks of the output circuit of the first pair of amplifiers being tuned to produce a narrow resonant response at each of a first pair of widely separated frequencies, one disposed in each of the said pair of widely separated broad radio-frequency bands; the networks of the output circuit of the second pair of amplifiers being tuned to produce a narrow resonant response at each of a second pair of widely separated frequencies, one overlapping each of the resonant responses of the output circuit of the first pair of amplifiers and disposed in each of the said pair of widely separated broad radio-frequency bands; and the networks of the output circuit of the third pair of amplifiers being tuned to produce a narrow resonant response at each of a third pair of widely separated frequencies each overlapping one of the before-mentioned resonant responses in order to produce resultant frequency responses corresponding to the said pair of widely separated broad radio-frequency bands; similar neutralizing capacitances connected between the control electrode of each of the amplifiers of the second, third and fourth pairs of amplifiers and the anode of the other amplifier of the corresponding pair of amplifiers; the fourth pair of amplifiers having an output circuit comprising a pair of similar networks each having a series-connected inductance and capacitance and a shunt-connected further inductance provided with an intermediate connection to the said positive terminal of the source of anode potential, the output circuit of the fourth pair of amplifiers being tuned broadly to respond to the said pair of widely separated broad radio-frequency bands.

10. An electric system having, in combination, three pairs of push-pull connected vacuum-tube amplifiers each amplifier having an anode, a control electrode and a cathode; two similar output circuits, one connected between the anodes of each of the first two pairs of amplifiers and the control electrodes of the next-following pair of amplifiers and each comprising a pair of similar networks having an inductance and a condenser connected in series circuit, further inductive means connected between the series connections of the said inductance and condenser of each network and provided with an intermediate connection to the positive terminal of a source of anode potential for the amplifiers, a pair of similar resistors connecting the control electrode of each of the said next-following pair of amplifiers to ground and a further resistor connecting the cathodes thereof to ground; the networks of the output circuit of the first pair of amplifiers being tuned to produce a narrow resonant response at each of a first pair of widely separated frequencies and the networks of the output circuit of the second pair of amplifiers being tuned to produce a narrow resonant response at each of a second pair of widely separated frequencies, one overlapping each of the resonant responses of the output circuit of the first pair of amplifiers in order to produce a pair of widely separated relatively broad resultant frequency responses; similar neutralizing capacitances connected between the control electrode of each of the amplifiers of the three pairs of amplifiers and the anode of the other amplifier of the corresponding pair of amplifiers; the third pair of amplifiers having an output circuit comprising a pair of similar networks each having a series-connected inductance and capacitance and a shunt-connected further inductance provided with an intermediate connection to the said positive terminal of the source of anode potential.

11. An electric system having, in combination, three pairs of push-pull connected vacuum-tube amplifiers each amplifier having an anode, a control electrode and a cathode; an input circuit associated with the first pair of amplifiers for receiving through coupling condensers anti-phase signals and having means comprising inductance for applying the signals between the control electrode and the cathode of each of the first pair of amplifiers, two similar output circuits, one connected between the anodes of each of the first and second pairs of amplifiers and the control electrodes of the second and third pair of amplifiers, respectively, and each comprising a pair of similar networks having an inductance and a condenser connected in series circuit, further inductive means connected between the series connections of the said inductance and condenser of each network and provided with an intermediate connection to the positive terminal of a source of anode potential for the amplifiers, a pair of similar resistors connecting the control electrode of each of the said second and third pair of amplifiers to ground and a further resistor connecting the cathodes thereof to ground; the networks of the output circuit of the first pair of amplifiers being tuned to produce a narrow resonant response at each of a first pair of widely separated frequencies and the networks of the output circuit of the second pair of amplifiers being tuned to produce a narrow resonant response at each of a second pair of widely separated frequencies, one overlapping each of the resonant responses of the output circuit of the first pair of amplifiers in order to produce a pair of widely separated relatively broad resultant frequency responses; and similar neutralizing capacitances connected between the control electrode of each of the amplifiers of the second and third pairs of amplifiers and the anode of the other amplifier of the corresponding pair of amplifiers.

References Cited in the file of this patent

UNITED STATES PATENTS

| | | |
|---|---|---|
| Re. 19,232 | Dalpayrat | July 10, 1934 |
| 1,438,828 | Houck | Dec. 12, 1922 |
| 1,603,806 | Riegger | Oct. 19, 1926 |
| 1,938,620 | Braden | Dec. 12, 1933 |
| 1,945,096 | Tellegen | Jan. 30, 1934 |
| 2,005,084 | Hansell | June 18, 1935 |
| 2,075,604 | Finch | Mar. 30, 1937 |
| 2,097,514 | Chaffee | Nov. 2, 1937 |
| 2,133,808 | Carlson | Oct. 18, 1938 |
| 2,167,079 | Landon | July 25, 1939 |
| 2,179,956 | Roberts | Nov. 14, 1939 |
| 2,316,883 | Mountjoy | Apr. 20, 1943 |
| 2,404,270 | Bradley | July 16, 1946 |
| 2,480,205 | Wallman | Aug. 30, 1949 |

OTHER REFERENCES

Text book—Vacuum Tube Amplifiers, Valley and Wallman Radiation Lab. Series, 1948; McGraw-Hill Book Co.; chapter V, pp. 201–231.